US012665900B2

(12) United States Patent
Gong et al.

(10) Patent No.: US 12,665,900 B2
(45) Date of Patent: Jun. 23, 2026

(54) COMPUTING SYSTEMS AND METHODS FOR MULTI-MODAL AUTHENTICATION AND LEARNING

(71) Applicant: Dell Products L.P., Round Rock, TX (US)

(72) Inventors: Min Gong, Shanghai (CN); Zijia Wang, London (GB); Mustafa AlBado, Cork (IE)

(73) Assignee: Dell Products L.P., Round Rock, TX (US)

( * ) Notice: Subject to any disclaimer, the term of this patent is extended or adjusted under 35 U.S.C. 154(b) by 137 days.

(21) Appl. No.: 18/884,641

(22) Filed: Sep. 13, 2024

(65) Prior Publication Data

US 2026/0081916 A1      Mar. 19, 2026

(51) Int. Cl.
*G06F 21/00*      (2013.01)
*H04L 9/40*      (2022.01)

(52) U.S. Cl.
CPC .......... *H04L 63/0861* (2013.01); *H04L 63/10* (2013.01)

(58) Field of Classification Search
CPC ........................... H04L 63/0861; H04L 63/10
See application file for complete search history.

(56) References Cited

U.S. PATENT DOCUMENTS 12,452,368 B2 * 10/2025 Corzo ................... H04M 3/493
2023/0157757 A1 * 5/2023 Braido ................... G16H 20/40
345/419

2023/0157762 A1 * 5/2023 Braido ................... A61B 34/37
600/424
2024/0273265 A1 * 8/2024 Kundu ................... G06F 30/27
2025/0147957 A1 * 5/2025 Verkruyse ......... G06F 16/24522
2025/0260565 A1 * 8/2025 Abdelsamie .......... H04L 9/3239
2025/0392664 A1 * 12/2025 Corzo ................... H04M 3/493

OTHER PUBLICATIONS

Jessica O. Anabor, "Multimodal Biometrics: For Authorisation and Authentication," 2022, Breakthroughs in Digital Biometrics and Forensics, pp. 29-48, Publisher: Springer International Publishing.
Marina L. Gavrilova, et al., "A Multifaceted Role of Biometrics in Online Security, Privacy, and Trustworthy Decision Making," Breakthroughs in Digital Biometrics and Forensics, 2022, pp. 303-324, Publisher: Springer International Publishing.
Richard Brown, et al., "A novel multimodal biometric authentication system using machine learning and blockchain," Selected Papers from the 12th International Networking Conference: INC Dec. 2020, 2021, 13 pages, Publisher: Springer International Publishing.
Himanshu Purohit, et al., "Analytical study on users' awareness and acceptability towards adoption of multimodal biometrics (MMB) mechanism in online transactions: a two-stage SEM-ANN approach," Journal: Multimedia Tools and Applications, No. 9, Sep. 21, 2022, pp. 14239-14263, Publisher: Springer Science and Business Media LLC.

* cited by examiner

*Primary Examiner* — Mahfuzur Rahman
(74) *Attorney, Agent, or Firm* — Fogarty LLP

(57)      ABSTRACT

Systems and methods and computer program products support authentication of a user for access to a computing resource. A method may include applying weights to preliminary results of machine learning (ML) models. The method may authenticate or not authenticate the user based upon whether the weighted sum of the preliminary results corresponds to an authentication condition.

16 Claims, 6 Drawing Sheets

100

300

400

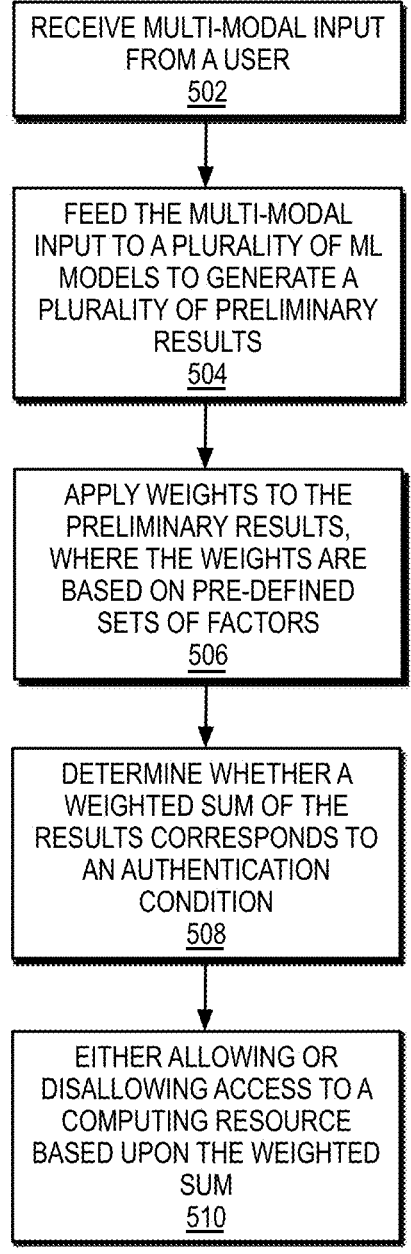

RECEIVE MULTI-MODAL INPUT
FROM A USER
502

FEED THE MULTI-MODAL
INPUT TO A PLURALITY OF ML
MODELS TO GENERATE A
PLURALITY OF PRELIMINARY
RESULTS
504

APPLY WEIGHTS TO THE
PRELIMINARY RESULTS,
WHERE THE WEIGHTS ARE
BASED ON PRE-DEFINED
SETS OF FACTORS
506

DETERMINE WHETHER A
WEIGHTED SUM OF THE
RESULTS CORRESPONDS TO
AN AUTHENTICATION
CONDITION
508

EITHER ALLOWING OR
DISALLOWING ACCESS TO A
COMPUTING RESOURCE
BASED UPON THE WEIGHTED
SUM
510

COMPUTING SYSTEMS AND METHODS FOR MULTI-MODAL AUTHENTICATION AND LEARNING

FIELD

The present disclosure relates to computing systems and, more particularly, to systems and methods for multi-modal authentication and learning for user interactions.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In various embodiments, a method includes: receiving multi-modal input from a user; feeding the multi-modal input to a plurality of machine learning (ML) models to generate a plurality of preliminary results; applying a first weight to a first preliminary result of the plurality of preliminary results, and applying a second weight to a second preliminary result of the plurality of preliminary results, wherein the first weight is based upon a first pre-defined set of factors and wherein the second weight is based upon a second pre-defined set of factors; determining whether a weighted sum of the preliminary results, including the first preliminary result times the first weight and the second preliminary result times the second weight, corresponds to an authentication condition; and either allowing or disallowing the user access to a computing resource based upon whether the weighted sum of the preliminary results corresponds to the authentication condition.

In various embodiments, an IHS (Information Handling System) includes: one or more processors; one or more memory devices coupled to the one or more processors, the one or more memory devices storing computer-readable instructions that, upon execution by the one or more processors, cause the IHS to: receive multi-modal input from a user during authorized use of the IHS by the user; feed the multi-modal input to a plurality of machine learning (ML) models to generate a plurality of preliminary results; apply a first weight to a first preliminary result of the plurality of preliminary results, and applying a second weight to a second preliminary result of the plurality of preliminary results, wherein the first weight is based upon a first pre-defined set of factors and wherein the second weight is based upon a second pre-defined set of factors; determine whether a weighted sum of the preliminary results, including the first preliminary result times the first weight and the second preliminary result times the second weight, corresponds to an authentication condition; and authorize the user and allow access to the IHS in response to the weighted sum of the preliminary results corresponding to the authentication condition.

In various embodiments, a computer-readable storage device having instructions stored thereon for multi-modal authentication, wherein execution of the instructions by one or more processors of an information handling system (IHS) causes the one or more processors to: receive multi-modal input from a user; feed the multi-modal input to a plurality of machine learning (ML) models to generate a plurality of preliminary results; apply a first weight to a first preliminary result of the plurality of preliminary results, and applying a second weight to a second preliminary result of the plurality of preliminary results, wherein the first weight is based upon a first pre-defined set of factors and wherein the second weight is based upon a second pre-defined set of factors; determine whether a weighted sum of the preliminary results, including the first preliminary result times the first weight and the second preliminary result times the second weight, corresponds to an authentication condition; and disallow the user access to the IHS based upon whether the weighted sum of the preliminary results corresponds to the authentication condition.

BRIEF DESCRIPTION OF THE DRAWINGS

The present disclosure may be better understood, and its numerous objects, features and advantages made apparent to those skilled in the art by referencing the accompanying drawings. The use of the same reference number throughout the several figures designates a like or similar element.

FIG. 5 is an illustration of an example method for authorizing a user to access a computing resource, according to some embodiments.

DETAILED DESCRIPTION

Figure 1:
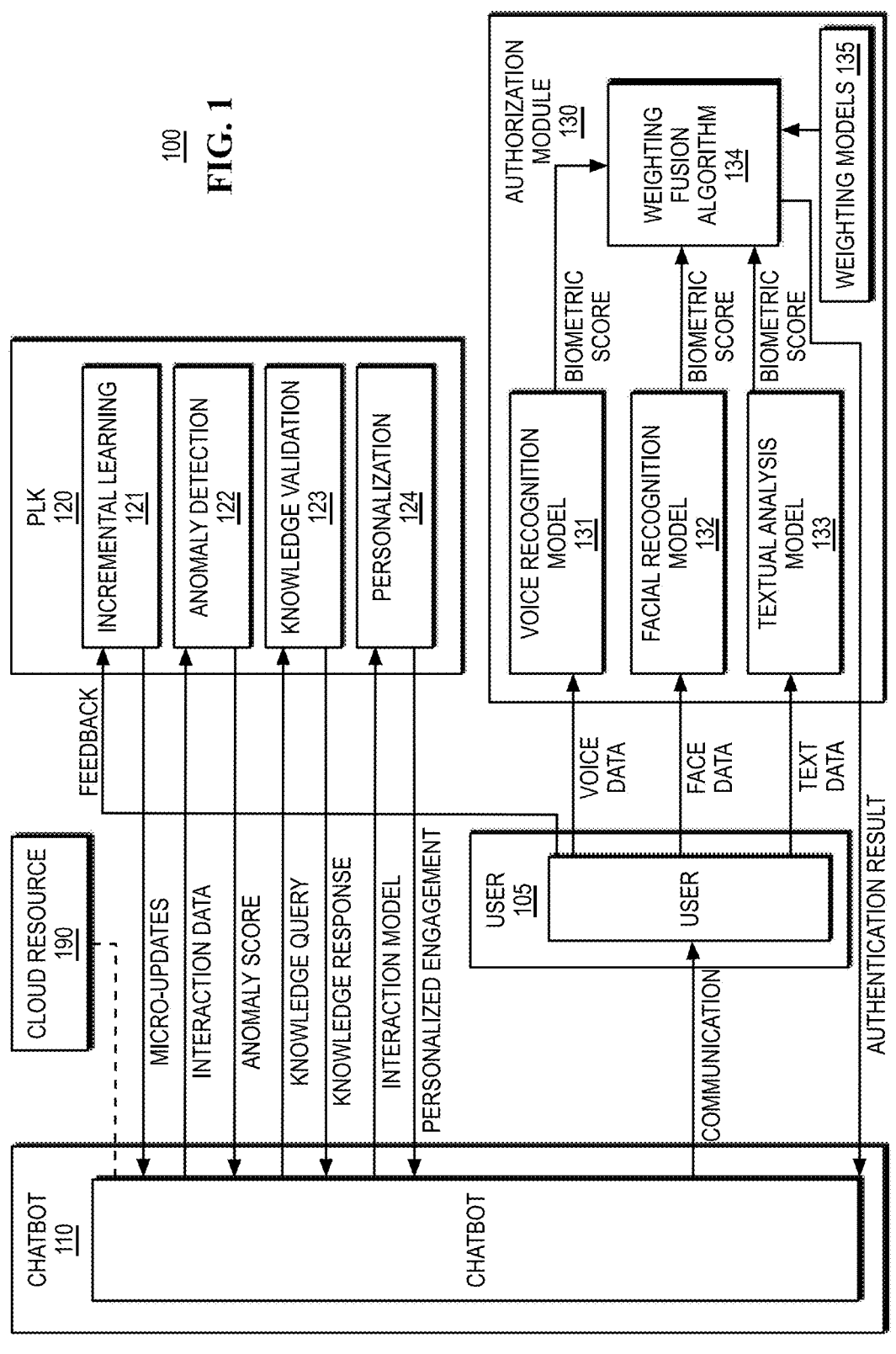
FIG. 1 is an illustration of an example system, for authorizing a user, according to various embodiments.

In the following description, numerous specific details are set forth in order to provide a thorough understanding of embodiments of the present disclosure. It will be apparent to one skilled in the art that embodiments of the present disclosure may be practiced without some of these specific details. Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). While embodiments of the present disclosure have been illustrated and described, the disclosure is not limited to these embodiments only. Numerous modifications, changes, variations, substitutions, and equivalents will be apparent to those skilled in the art, without departing from the scope of the disclosure, as described in the claims.

Some interactive systems may fall short in security and personalization due to their reliance on single-modal biometric authentication and static learning models. These limitations may undermine the security, adaptability, and user engagement potential of such systems, thus necessitating an advanced alternative.

Various embodiments include systems, methods, and computer program products for an advanced user interaction model through a multi-modal biometric authentication module integrated with a Personalization and Learning Kernel (PLK) module. Such embodiments may provide a secure, adaptive, and personalized user experience by utilizing machine learning algorithms and data processing techniques. Such embodiments may enhance user engagement through tailored, secure, and adaptive communication.

In one example, a human user may attempt to access a computing resource, such as the user's own laptop, and edge device, or other resource. The resource may be protected by an authentication process, such as a multi-modal process, and the user may enter specific information and then either be authenticated or not based on the information. Examples may include voice input data, facial scan data, typed text data, and the like.

Various embodiments may include training multiple machine learning (ML) models, such as one ML model per each mode. In the example above, there may be one model for voice input data, one model for facial scan data, one model for typed text data, and/or the like. Such embodiments may also include trained models that generate weight values for each of the types of input data. For instance, one model may generate a weight value corresponding to voice input data, another model may generate a weight value corresponding to facial scan data, yet another model may generate a weight value corresponding to typed text data, and/or the like.

During training, a user may provide voice data, facial scan data, typed text data, and/or the like. Various embodiments may then train the respective ML models based on that input. Some embodiments may also receive environmental and contextual input, whether directly from the human user or not. Examples of environmental information may include background noise and microphone quality, and examples of contextual information may include time of day or location. Various embodiments may then train the weighting models based on the environmental information and contextual information to generate weights.

Continuing with the example, during normal use, and after training the ML models, the user may attempt to access the computing resource. The user may enter input for multiple modes (e.g., voice input data, facial scan data, typed text data), and a computing device may then feed that input data to respective ML models. The ML models may provide preliminary results, and the computing device may further apply the weights to each of the respective preliminary results. For instance, the output of the ML model for voice input data may be multiplied by its respective weight, and the outputs of the other ML models may be multiplied by their respective weights. The computing device may then analyze the sum of the weighted preliminary outputs to determine whether the sum corresponds to an authentication condition. The computing device may then either allow or disallow access to the resource based upon this analysis.

Various embodiments may provide for incremental learning. For instance, when new user input data is received, some embodiments may provide for incremental learning based upon that new user input data. Some embodiments may further allow for validation of the new user input data, such as by a consensus algorithm. If the new user input data passes the consensus algorithm, then it may be used for incremental learning; alternatively, if the new user input data does not pass the consensus algorithm, then it may be discarded.

In an example, various embodiments may be configured to detect anomalies. For instance, during normal use and after authentication, the computing device may detect unusual user input data, such as an unrecognized voice, unrecognized face, unrecognized textual patterns, and/or the like. The computing device, in response to the anomaly, may then request that the user logged in and authenticate using a different method. Assuming that the user logs in using a different method, then the user may be allowed to access the computing resource, and the computing device may then pass that anomalous data to the validation network for consensus. As in the example above, the consensus algorithm may be used to determine whether to use that new data for incremental learning (or not).

Thus, various embodiments may provide features that may be applied to reduce risk of malicious use of a computing resource as well as increase user satisfaction of a computing resource. For instance, various embodiments may provide for multi-modal authentication. By contrast, other solutions may use only a single mode of biometric authentication. Various embodiments may fuse the results of the multiple modes into a weighted sum, thereby taking advantage of the multiple modes and reducing risk of malicious use. Some embodiments may allow for a dynamic weighting algorithm, such as discussed above, based on environmental and contextual factors. Furthermore, data validation, such as by a consensus algorithm, may allow an extra layer of safety so that various models may be incrementally trained over time with less risk of training on toxic or otherwise undesirable information. Moreover, some embodiments may include behavioral biometrics, such as text entry behavior, along with physiological biometrics, thereby adding a layer of security and personalization. Some embodiments may provide for continuous learning, such as by incremental learning, thereby allowing for adaptation over time. Various embodiments may further allow for anomaly detection to maintain system integrity.

Various embodiments may include advantages over other solutions. By combining various biometric modalities, various embodiments may reduce the false acceptance and false rejection rates, a common issue with unimodal systems. Some dynamic weighting algorithms may ensure that the computing system's performance is optimized under varying conditions, a level of adaptability that is not possible with the fixed algorithms of other solutions. The decentralized architecture not only addresses the scalability and privacy concerns associated with centralized databases but also reduces the risk of a single point of failure, which could be catastrophic in a security context. Furthermore, the inclusion of behavioral biometrics and continuous learning allows various embodiments to create a more nuanced user profile, leading to a more secure and personalized user experience. The anomaly detection capabilities may fortify the system against novel threats, ensuring long-term integrity and trustworthiness.

Furthermore, the dynamic weighting may be based upon pre-defined environmental and contextual factors. Such pre-defined environmental and contextual factors may be selected to provide better performance under expected user operation scenarios. For instance, if it is expected that a common use case is a human user attempting to login to a laptop at a place of work, then factors such as background noise, location, and others may be more likely to reduce false acceptance and false rejections. Pre-defining the factors may force the weighting models to focus on those specific factors rather than attempt to focus on other factors, thereby allowing the human intuition of pre-defining the factors to assist in reducing vulnerability of the computing resource. As a result, it is expected that various embodiments may allow authorized users to access computing resources, disallow unauthorized users, thereby providing increased user satisfaction and reducing vulnerability to malicious use.

FIG. 1 is an illustration of system 100, for authorizing a user, according to various embodiments. In system 100, user 105 may interface with an information handling system (IHS), such as a laptop computer, desktop computer, server computer, portable wireless device, tablet computer, or the like to gain access to a computing resource. Each of the authorization module 130, personalization and learning kernel (PLK) module 120, and chat bot 110 may be implemented by applications that run on either the same IHS or a different IHS. An example of an IHS is described in more detail with respect to FIG. 7, and software functionality running on an IHS is described in more detail with respect to FIG. 6. The cloud resource 190 may be a vendor-managed resource that tracks use and permissions.

In an example use case, the human user 105 may reach a login screen of the computing resource and may encounter chat bot 110, requesting that the user provide a voice sample, a facial image, and textual input. In response, the human user 105 may provide that input, which is received by the authentication module 130 either directly from the human user 105, via the chat bot 110 or some other technique. The authentication module 130 includes a trained voice recognition biometric ML model 131, a trained facial recognition biometrics ML model 132, and a trained textual analysis biometrics model 133. The authorization module 130 feeds the user input to the trained models 131-133, and each of those trained models 131-133 outputs a respective score. The three scores from the trained models 131-133 is received by weighting fusion algorithm 134. The weighting fusion algorithm 134 has access to the weighting models 135. The weighting models 135 are discussed in more detail below, and they are trained to generate weights for each of the scores based on environmental and contextual factors.

The weighting fusion algorithm generates a fused result, which in some embodiments may include a weighted sum of the scores received from the trained ML models 131-133. The authentication module 130 may then determine whether the fused result corresponds to an authentication condition.

For instance, the authentication module 130 may compare the fused result to a threshold or may provide a more sophisticated algorithm. In any event, the authentication module may determine to authenticate the user or not authenticate the user based on the fused result. In some implementations, the authentication module 130 may output a result to the user 105, such as via chat bot 110 or other appropriate technique. If the user is not authenticated, then the chat bot 110 may prompt the user to try again or to use an alternative form of authentication. If the user is authenticated, then the chat bot 110 may indicate that the user is authenticated, and the login screen may be transitioned to an interface that allows access to the requested computing resource.

PLK module 120 may be used for incremental learning, anomaly detection, knowledge validation, and building a user profile. For instance, PLK module 120 may include a software application, run on a computing device, and it may have multiple sub modules 121-124. Incremental learning module 121 may receive user input and provide incremental learning in addition to the training received by each of the models 131-133. Anomaly detection module 122 may operate periodically, continually, or at specified times to determine whether user behavior or other user data may indicate an anomaly. The anomaly detection module 122 may, from time to time, request that the user be reauthorized in response to detecting an anomaly. Knowledge validation module 123 may use a consensus algorithm or other appropriate algorithm to determine whether received data should be used for incremental learning, such as by incremental learning module 121. Personalization module 124 may continually build a user profile based upon received user input. The functions of the modules 121-124 are described in more detail below.

Figure 2:
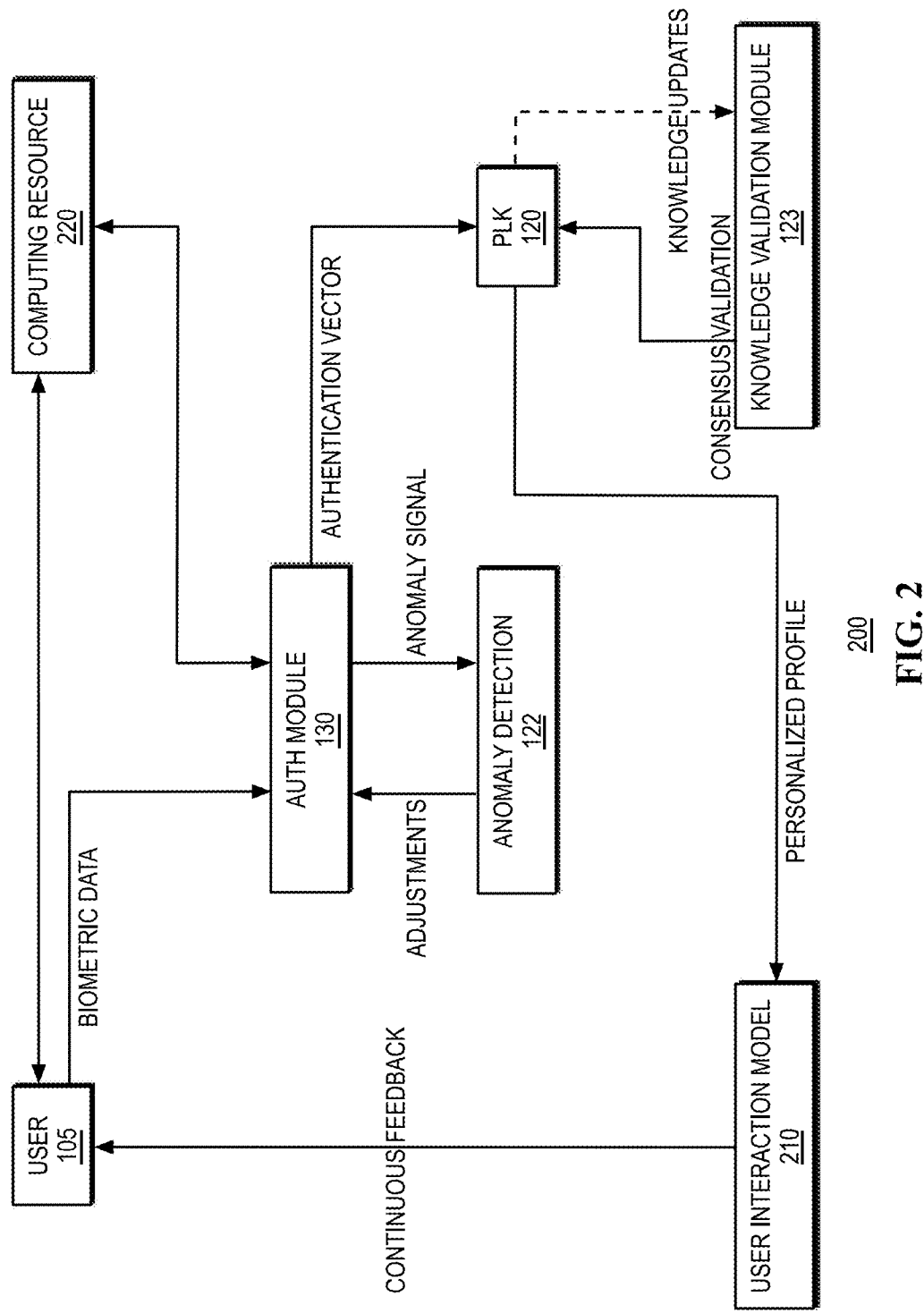
FIG. 2 is a simplified illustration of the functionalities and components described with respect to FIG. 1, according to some embodiments.

FIG. 2 is a simplified illustration of the functionalities and components described with respect to FIG. 1. In the example of FIG. 2, the human user 105 may interface with an IHS (not shown) to attempt to access computing resource 220. The computing resource 220 may include the IHS with which the human user 105 interfaces or not. Furthermore, the authentication module 130 is configured to allow access or deny access by the user 105 to the computing resource 220 depending upon results of the authentication process. The user 105 provides biometric data (e.g., facial image data, voice data, textual entry data) to the authentication module 130, as described above with respect to FIG. 1. The authentication module 130 may then feed the biometric data from the user to the trained models 131-133, generate a fused result, and analyze the fused result to either allow or deny access by the user 105.

The authentication module 130 communicates with the PLK module 120 according to various techniques. For instance, the authentication module 130 may provide an authentication vector to PLK module 120 so that PLK module 120 may build a user interaction model 210 that indicates a history of user access, both successful accesses and unsuccessful accesses. PLK module 120 may also receive biometric data from time to time, such as at anomaly detection module 122 and knowledge validation module 123. New data from the user may be processed by PLK module 120, via knowledge validation module 123 to validate the data and to provide continuous learning if the data is validated. Anomaly detection module 122 may work with the authentication module 130 to analyze incoming data during use, as described in more detail below. The authentication module 130 and the anomaly detection module 122 may prompt the user to re-authorize in the case of an anomaly.

In any event, the PLK module 120 may build the user interaction model 210, such as by adding fused results, historical interactions, and other data from time to time.

Figure 3:
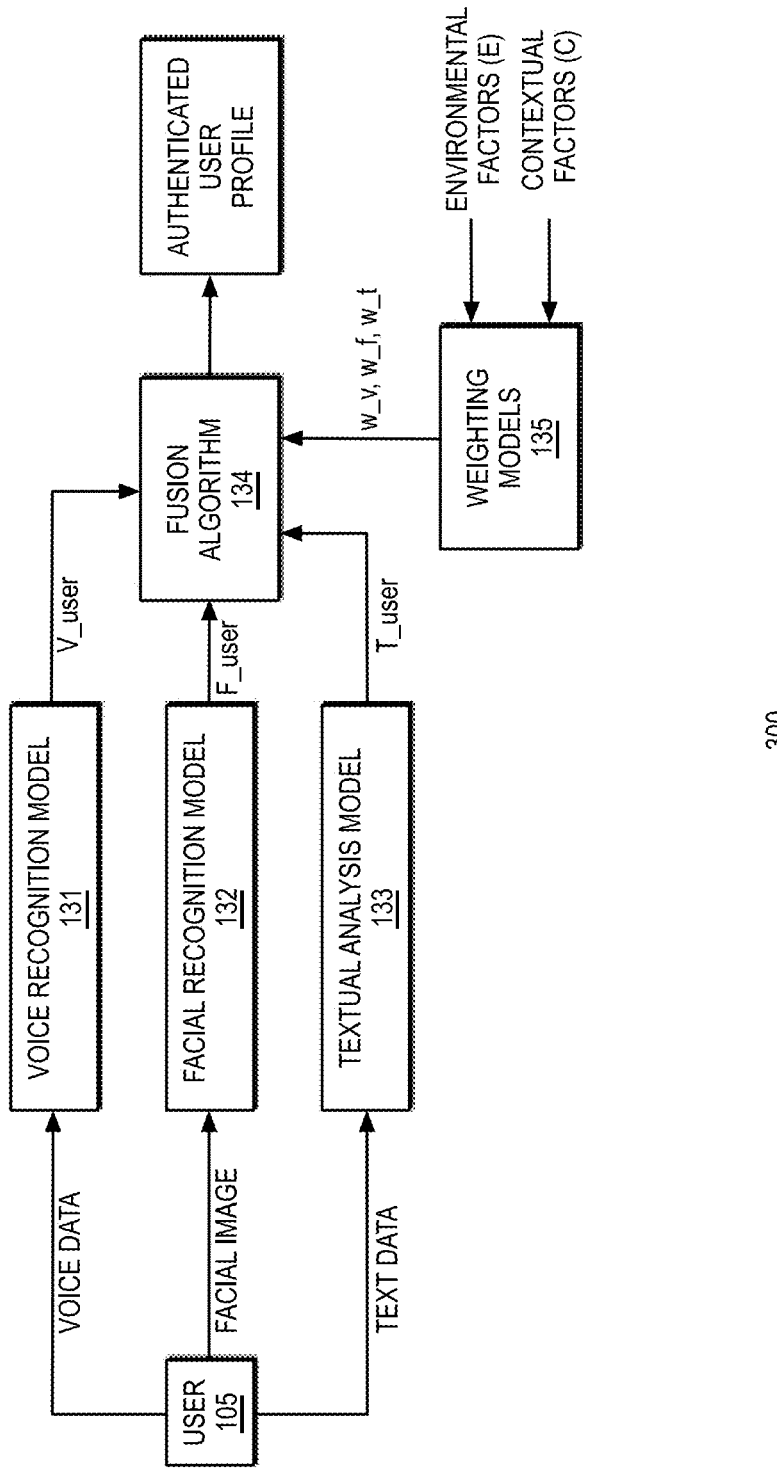
FIG. 3 is an illustration of example relationships between the models, the fusion algorithm, and the weighting models of FIG. 1, according to some embodiments.

FIG. 3 is an illustration of relationships between the models 131-133, the fusion algorithm 134, and the weighting models 135, according to various embodiments. First, an explanation of training the models 131-133 and 135. An IHS, such as a user's laptop, an edge device, a server, or other appropriate IHS may train the models 131-133 and 135.

Training the models 131-133 may include optimizing model parameters θ_v, θ_f, θ_t. In this example, θ_v represents parameters of the voice recognition model 131, θ_f represents parameters of the facial recognition model 132, and θ_t represents parameters of the textual analysis model 133.

Also, the dynamic weight parameters w_v, w_f, w_t may be trained. In this example, w_v represents a weight for the output of the voice recognition model 131, w_f represents a weight for the output of the facial recognition model 132, and w_t represents a weight for the output of the textual analysis model 133. There is also a learnable parameter γ, which determines the sensitivity of the dynamic weights to the environmental and contextual factors.

The training process may include calculating the outputs of each of the models 131-133. Each recognition module produces an output based on its respective input data.

$$V\_user = f\_v(\text{voice data}; θ\_v)$$

$$F\_user = f\_f(\text{facial data}; θ\_f)$$

$$T\_user = f\_t(\text{text data}; θ\_t)$$

Here, f_v, f_f, and f_t represent the functions of the voice, facial, and textual recognition models 131-133, respectively, parameterized by θ_v, θ_f, and θ_t.

The training process may further include calculating the fused authentication vector, denoted as F_user. The fused authentication vector F_user may be computed in some examples by integrating the outputs from the three models 131-133:

$$F\_user = w\_v \cdot V\_user + w\_f \cdot F\_user + w\_t \cdot T\_user \qquad (50)$$

The weights w_v, w_f, and w_t may be dynamically adjusted based on the environmental and contextual factors E and C, such as by Equation 5 (below).

Further, the IHS may compare the fused vector F_user with ground truth F_true (the correct fused vector corresponding to the actual user's identity). The objective during training may be to minimize the difference between F_user and F_true. The difference may be given by a loss function: Loss=||F_user−F_true||^2.

The loss function may be used to optimize the model parameters θ_v, θ_f, θ_t, the dynamic weights w_v, w_f, w_t, and the learnable parameter γ, through a gradient-based optimization algorithm.

The IHS may then iteratively update the parameters to minimize the loss function:

$$θ ← θ − α \cdot ∇\_θ \text{ Loss}$$

Where θ={θ_v, θ_f, θ_t, w_v, w_f, w_t, γ}, and α is the learning rate.

Such actions may be performed multiple times, as appropriate, until the models 131-133 and 135 produce desired outputs.

In one example, the voice recognition model 131 utilizes a (long short-term memory networks) LSTM network with an attention mechanism to extract features from a user's voice data, forming a unique voiceprint. The attention mechanism may allow the system to focus on the most informative parts of the voice sample. An example of the voice recognition model 131 is given by Equation 1:

$$Vuser = LSTMattention(voicedata) \qquad (1)$$

The facial recognition model 132 may be implemented using, e.g., a ResNet-based convolutional neural network (CNN) architecture that is robust to various conditions and includes liveness detection to prevent spoofing. An example of the facial recognition model 132 is given by Equation 2:

$$Fuser = ResNetCNN(facialimage) \qquad (2)$$

The textual analysis model 133 may be implemented using a transformer-based model. In one example, the model 133 may be fine-tuned to understand individual linguistic styles, contributing to the authentication process by adding behavior to biometrics. An example of the textual analysis model 133 is given by Equation 3:

$$Tuser = \text{Transformer}(text_{data}) \qquad (3)$$

The fusion algorithm 134 may be configured to dynamically adjust the weights assigned to each modality based on the context factors and environmental factors. An example of the algorithm 134 is given by Equation 4, where F_user is the output from algorithm 134:

$$F\_user = w\_v \cdot Vuser + w\_f \cdot Fuser + w\_t \cdot Tuser \qquad (4)$$

In this example, w_v, w_f, w_t are the weights for voice recognition, facial recognition, and textual analysis models 131-133, respectively. These weights are not static in some embodiments; rather, each of the weights may be adaptively calculated using a set of environmental and contextual factors E and C as given in Equation 5. Equation 5 may be applied separately for each of w_v, w_f, and w_t.

$$w = \text{Softmax}(γ \cdot (E \times C)) \qquad (5)$$

In Equation 5, γ is a learnable parameter that determines the sensitivity of the weights to the parameters. The context C includes the user's current interaction patterns, while the environmental factors E may include noise levels for voice recognition, lighting conditions for facial recognition, and linguistic context for textual analysis.

Of course, the scope of implementations may include techniques other than those listed in Equations 1-5. In the example of FIG. 3, the environmental factors encompass various conditions that may influence the performance of the authentication module 130. Environmental factors may vary based on the biometric modality being used (e.g., voice, facial recognition, or textual analysis). Examples of environmental factors may include, for voice recognition, background noise (a measure of ambient noise level during voice recording) and microphone quality (a measure of quality of the microphone capturing the user's voice). Examples of environmental factors for facial recognition may include lighting conditions (such as by evaluating lighting intensity and direction during face image capture) and pose variability (ability to consider different head angles and facial expressions of the user during face image capture). Examples of environmental factors for textual analysis may include language context (understanding the language being used by the user) and typing speed (analyzing the user's typing speed and patterns).

The context factors may include situational information that provides additional context for authentication, such as factors beyond the biometric data itself. Examples of contextual data may include temporal context data, such as time of day or day of week. Context data may also include spatial context data, such as location (e.g., a location where the user is attempting to access the computing resource, such as at home or an office) and network environment (e.g., Wi-Fi, cellular data, virtual private network). There may also be behavioral context data, which may include user interaction patterns (e.g., previous login behavior, session duration, and the like) and task context (an analysis of an action the user is attempting to perform, such as logging in, performing a transaction, and the like).

Of course, the scope of implementations may include any environmental factors and context factors that may be appropriate for authenticating a user and according to the particular modalities used for authenticating. In the present example, the environmental factors and the context factors may be pre-defined and exclusive. Furthermore, the environmental and contextual factors may be known ahead of time and implemented within the model 135 before training begins. In other words, the IHS may be configured to train the model 135 only on a pre-defined set of context factors and environmental factors. Such action may force the model 135 to generate the weights w_v, w_f, w_t as outputs, where those weights were generated only based on the pre-defined environmental factors and contextual factors (and on $\gamma$). Thus, the model 135 may be trained on a narrow and known set of factors, where that set of factors has been purposefully selected by an engineer to provide desired authentication outcomes.

Going back to the algorithm 134, it combines the environmental factors and contextual factors to determine the weights for each biometric modality (e.g., voice, face, text). In one example, the weights (w_v), (w_f), and (w_t) represent the weights for voice, facial, and textual recognition modules, respectively. The overall fused user profile (F_user) is calculated as follows: [F_user=w_v·Vuser+ w_f·Fuser+w_t·Tuser], where:

(Vuser) represents the biometric data from voice recognition;

(Fuser) represents the biometric data from facial recognition;

(Tuser) represents the biometric data from textual analysis.

The model 135 dynamically adjusts the weights (w_v), (w_f), and (w_t) based on the combined influence of E and C. The specific calculation of weights and the determination of factors (E) and (C) depend on the implementation details and the learning process of a given system. In some implementations, such factors may be fine-tuned based on real-world data and continuous monitoring to optimize the authentication process.

As noted above, the fusion algorithm 134 outputs F_user, which may include a weighted sum of the outputs of the models 131-133. The authentication module 130 may use F_user to determine whether to authenticate the user or to not authenticate the user. Additionally, F_user may be used to generate a user profile vector to encapsulate the user's biometric signature and interaction preferences. The IHS may associate the user profile vector with any appropriate module, such as chat bot 110, PLK module 120, or authorization module 130. The IHS may also store the user profile vector to volatile or nonvolatile memory as appropriate and may further update the user profile vector as new user data is received. In one example, the user data may be described by Equation 6:

$$Uprofile = \{F\_user, Pref\_user, Hinteractions\} \tag{6}$$

In Equation 6, where F_user represents the fused biometric data, Pref_user denotes personal preferences and interaction styles, and H_interactions is the history of user interactions that feed into the learning algorithm for personalization. In this example, F_user is a vector that represents the weighted combination of the user's voice, facial, and textual biometric data. F_user is described in more detail above. Personal Preferences (Pref_user) is a vector that may include the user's preferred methods of authentication, interaction preferences such as language or tone, and any accessibility requirements. Furthermore, Interaction History (H_interactions) may be a vector that includes a record of past interactions, which could include timestamps, the nature of requests, the frequency of certain commands, and any feedback provided by the user.

For instance, if a user has a history of interacting with the system in a quiet environment and prefers text-based communication later in the day, the profile may adapt to give more weight to textual analysis during those times, providing a tailored interaction experience. An example is given by Equation 7:

$$Uprofileexample = \tag{7}$$
$$\{\{0.2 \cdot voiceprint + 0.5 \cdot facialfeatures + 0.3 \cdot textstyle\},$$
$$\{\text{'language':'English', 'tone':'formal'}\},$$
$$\{\text{'last'interaction:'23:00', 'preferred'authentication:'facial'}\}\}$$

Figure 4:
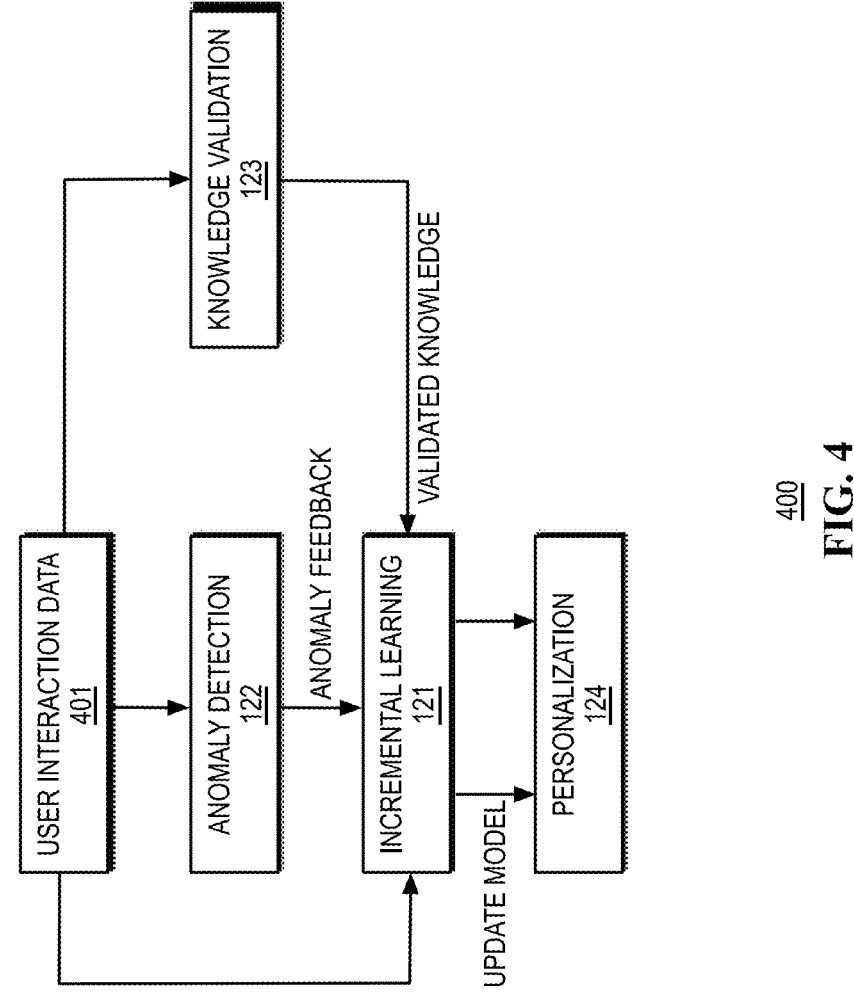
FIG. 4 is an illustration of an example workflow for the PLK module of FIG. 1, according to some embodiments.

FIG. 4 is an illustration of an example workflow 400 for the PLK module 120, according to some embodiments. The PLK module 120 receives user interaction data, including the biometric and behavioral data (e.g., voice recognition, facial image recognition, textual pattern recognition) as well as information that may indicate environmental factors (e.g., background noise) and contextual factors (e.g., time of day).

The incremental learning module 121 may receive the user interaction data 401 as well as an indication that the knowledge has been validated by knowledge validation module 123. Knowledge validation is discussed in more detail below, and in some instances it may generate a digital 0 (e.g., not validated) or a digital 1 (e.g., validated), which the incremental learning module 121 may use to determine whether to use the user interaction data 401.

In one example, incremental learning may allow for the integration of new data without full retraining. Nevertheless, full retraining is also possible in some implementations, such as after a threshold amount of user interaction data has been collected. In one example, incremental learning may be explained by Equation 8, where a represents the learning rate, and Information$_{new}$ represents new data within user interaction data 401.

$$Lnew = Lold + \alpha \cdot (\text{Information}_{new}) \tag{8}$$

The knowledge validation module 123 may employ a decentralized approach to verify the user interaction data 401. In one example, the knowledge validation module 123 may employ a consensus mechanism across a network of nodes. For instance, the nodes may be software modules respectively responsible for the models 131-133. Continuing with the example, the software modules responsible for the models 131-133 may be separate modules, and they may include unique functionality to either vote to validate or vote to not validate a particular piece of new user interaction data 401. Functionality to either vote to validate or not validate may include comparing a vector representing the user interaction data 401 against the current user profile (such as in Equation 6). A greater difference may make a vote not to validate more likely, whereas a smaller difference may make a vote to validate more likely. However, any appropriate functionality at a given node may be used. In another example, the nodes may be separate computing devices. In fact, the nodes may be any appropriate node.

Continuing with the example, each node may vote to either validate or not validate. The process applied to the votes may be described by Equation 9.

$$K_{validated} = \text{Consensus}(\text{Information}_{new}) \tag{9}$$

The consensus function of Equation 9 may be expanded, as shown in Equation 10:

$$K_{validated} = \frac{1}{N}\sum_{i=1}^{N}\text{validate}_i(\text{Information}_{new}) \tag{10}$$

In Equation 10, validate$_i$ represents the validation function of the i$^{th}$ node and N is the total number of nodes in the network. The consensus function may be defined as follows. In one example, when there are three separate nodes, the validate function may specify that two out of three votes wins. So if two nodes vote to not verify, and if one node votes to verify, then the two votes not to verify win, and the output of the consensus function may be, e.g., a digital zero. On the other hand, if two or more nodes vote to verify, then the output of the consensus function may be, e.g., a digital one. Of course, there may be any appropriate number of nodes and any appropriate technique to find consensus among the nodes.

The personalization module 124 tailors the interaction to individual user behaviors and preferences over time, using a dynamic profiling system. For instance, the personalization module 124 may be used to create a user profile P_user to adapt the behavior of any appropriate module of the IHS, such as the chat bot 110 (FIG. 1). The user profile in one example may be given by Equation 11, where the Personalize function is any appropriate function that may be applied to the interaction data 401 (Interaction_data) and the user profile (U_profile) of Equation 6.

$$P\_user = \text{Personalize}(\text{Interaction\_data}, U\_profile) \tag{11}$$

In one example, Equation 12 may be expanded as shown in Equation 12, where $\beta$ is a blending factor that determines the influence of historical interactions versus stated preferences, and Pref_user represents explicit user preferences.

$$P\_user = \beta \cdot H\_interactions + (1 - \beta) \cdot Pref\_user \tag{12}$$

The personalization module 124 may also employ a reinforcement learning algorithm to fine-tune the system's responses based on the user's feedback. An example of reinforcement learning is given by Equation 13, where R$_f$ is the reward estimation at time t, $\delta$ is the learning rate, and Feedback is the user feedback received regarding the interaction at time t.

$$R_{t+1} = R_t + \delta \cdot (\text{Feedback}_t - R_t) \tag{13}$$

Thus, as described above, the personalization module 124 manages a machine learning (ML) model, described by Equations 11-13. The ML model of the personalization module 124 may be used to tailor interactions with the user, such as interactions by chat bot 110 or other software modules of an IHS.

The anomaly detection module 122 also receives the user interaction data 401 (Interaction_data). The anomaly detection module 122 may identify deviations from established patterns, where it is assumed that such deviations may indicate a potential security risk, a need for a system update, or other condition. The anomaly detection module 122 may include an auto encoder and decoder pair (not shown) to compress and reconstruct the user interaction data 401. For instance, the auto encoder and decoder pair may be trained to capture the most salient features of user behavior. An example is given in Equations 14.

$$\text{Encoded}_{data} = \text{Encoder}(\text{Interaction}_{data}) \tag{14}$$
$$\text{Decoded}_{data} = \text{Decoder}(\text{Encoded}_{data})$$

The anomaly detection module 122 may then calculate a reconstruction error, such as by using Equation 15. The anomaly detection module 122 may be configured to detect an anomaly when the reconstruction error of Equation 15 exceeds a threshold T, which is set based on the distribution of errors on a validation set. In one example, if the reconstruction error is greater than the threshold T, then the output is a digital 1, to indicate an anomaly; otherwise the output is a digital 0 to indicate no anomaly.

$$\mathrm{Reconstruction}_{Error} = \|\mathrm{Interaction}_{data} - \mathrm{Decoded}_{data}\|_2 \qquad (15)$$

The output of the anomaly detection module 122 may be provided to the authorization module 130. In one example use case, the anomaly detection module 122 may monitor user interaction after a user has been authenticated and allowed access to the computing resource. However, there may be some kind of anomalous user input, such as an unrecognized face, an unrecognized voice, and unrecognized textual input pattern, and/or the like. The anomalous user input may cause a reconstruction error that is larger than the threshold T, causing the anomaly detection module 122 to output an indication of an anomaly. As a result, the authorization module 130 may then disallow the user's access to the computing resource and prompt the user to re-authorize. The user may then choose to re-authorize using the authorization module 130 or another authorization technique (e.g., multi-factor password authentication).

In this example, anomalous behavior may indicate that an unauthorized user has accessed the computing resource. Of course, various kinds of anomalous behavior may result from innocent use by the authorized user. For instance, a hoarse voice may result in anomalous voice input, a mask or different makeup may result in anomalous facial image, or a hand injury may result in anomalous textual input. However, the IHS may maintain security by denying access to a user, once anomalous data has been detected by the anomaly detection module 122, at least until the user re-authorizes.

Furthermore, such anomalous data may make its way to incremental learning module 121. For instance, should the user 105 successfully re-authorize, then that is an indication that the anomalous data may actually correspond to the user. In such a case, assuming the knowledge validation module 123 allows it, the incremental learning module 121 may include that anomalous data in incremental learning, and the personalization module 124 may update the model using the anomalous data.

FIG. 5 is an illustration of example method 500, for authorizing a user to access a computing resource, according to some embodiments. For instance, a human user 105 may interact with software modules 110, 120, and/or 130 to be authenticated in order to use the computing resource (e.g., computing resource 220). In one example, a user may interact with a login screen, chat bot 110, a user interface for the authorization module 130, a user interface for the PLK module 120, and/or the like.

The actions of method 500 may be performed by an IHS, which may execute computer-readable instructions to perform the actions. Such computer-readable instructions may be stored to a computer-readable medium, such as a storage drive or other device, which may be included in the IHS or may be separate from the IHS. The IHS may have one or more processors, which may be configured to execute the computer-readable instructions.

At action 502, the IHS receives multi-modal input from a user. An example of a user includes a human user 105, and it is understood that the human user may interface with the IHS through an input device, such as a keyboard, mouse, touchscreen, microphone, camera, and/or the like. The input device(s) may be part of the IHS or part of a different IHS.

Multi-modal input may include a multitude of different types of input, which may be received from a same user. For instance, the examples above discuss voice input, facial image input, and textual pattern input. However, those examples may be used in some implementations, though other implementations may use overlapping ones of those inputs or different ones of those inputs. Examples of other types of input, which may be included within multi-modal input, may include retina scan input, fingerprint input, palm print input, gait or other movement input, and/or the like.

At action 504, the IHS feeds the multi-modal input to a plurality of ML models to generate a plurality of preliminary results. For instance, this may be demonstrated by models 131-133 each receiving a different mode of input and outputting a different preliminary result-V_user, F_user, T_user.

At action 506, the IHS applies weights to the preliminary results. An example is shown above, where weighting algorithm 134 may apply weights (w_v, w_f, w_t) to each of the preliminary results. In this example the weights are based on sets of factors that are pre-defined even before model 135 is trained. Further in this example, the factors may be exclusive, so that other factors are not added to train the model beyond the pre-defined weights. Examples of factors include the environmental and contextual factors discussed above.

Further, in this example, and output of the action 506 may include a weighted sum of the results. In the examples above, the weighted sum may include F_user, such as given in Equation 4.

At action 508, the IHS determines whether a weighted sum of the results corresponds to an authentication condition. For instance, the IHS may determine whether F_user of Equation 4 is above or below a threshold for authentication. For instance, F_user being below the threshold may correspond to no authorization, whereas F_user being above or equal to the threshold may correspond to authorization. However, the IHS may analyze F_user in any appropriate manner and may determine an authentication condition in any appropriate manner.

At action 510, the IHS either allows or disallows access to a computing resource based upon the weighted sum. Continuing with the example, the IHS may allow access by the user to the computing resource if F_user corresponds to the authentication condition at action 508 and may deny access if F_user does not correspond to the authentication condition at action 508.

The scope of implementations is not limited to the series of actions illustrated in FIG. 5. Rather, various embodiments may add, omit, rearrange, or modify ones of the actions. In one example, the IHS may authorize the user and, during use, the IHS may detect an anomaly and may prompt the user to re-authorize and may even deny access to the user until the user re-authorizes. Furthermore, the IHS may continue to receive data from the user and may apply incremental learning, such as described above, may apply knowledge validation to the new data, and may further tune the user's profile by personalization module 124.

Furthermore, such actions may be repeated at any appropriate time, such as when a user shuts down the IHS and attempts to log back in, locks the IHS and attempts to log back in, after a pre-defined period of inactivity, and/or the like.

Figure 6:
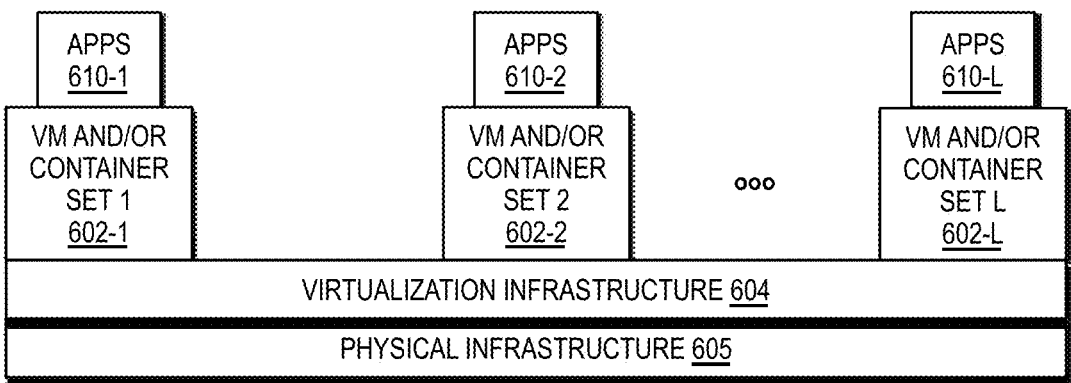
FIG. 6 shows an example processing platform including cloud infrastructure, according to some embodiments.
Figure 7:
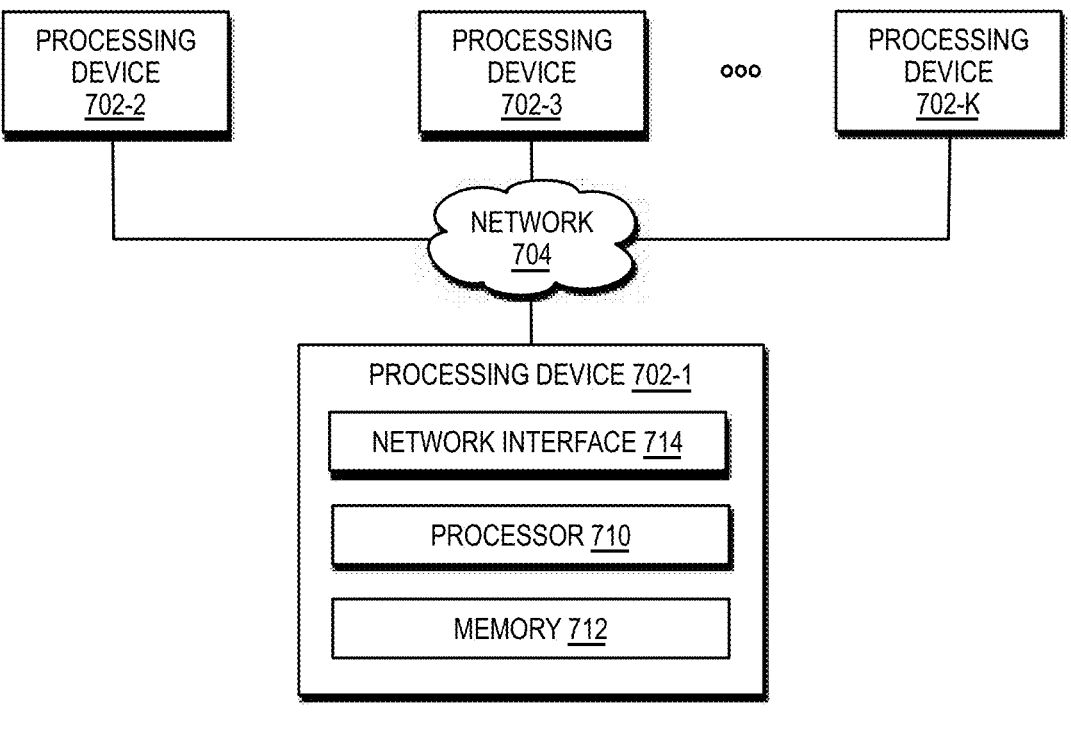
FIG. 7 shows an example processing platform, according to some embodiments.

FIG. 6 shows an example processing platform including cloud infrastructure 600. Cloud infrastructure 600 may represent an architecture that may be adopted by any computing resource or software module. For instance, the cloud resource 190 may be implemented according to the principles of cloud infrastructure 600. Furthermore, any of the modules, such as chat bot 110, PLK module 120, authorization module 130, and/or the like may be a software module run on a cloud resource. Additionally, a computing resource, such as the user 105 may attempt to access, may be implemented according to cloud infrastructure 600.

The cloud infrastructure 600 may include multiple virtual machines (VMs) and/or container sets 602-1, 602-2, . . . 602-L implemented using virtualization infrastructure 604. The virtualization infrastructure 604 runs on physical infrastructure 605 and may include one or more hypervisors and/or operating system-level virtualization infrastructure. The operating system-level virtualization infrastructure may include kernel control groups of a Linux operating system or other type of operating system.

The cloud infrastructure 600 further may include sets of applications 610-1, 610-2, . . . 610-L running on respective ones of the VMs/container sets 602-1, 602-2, . . . 602-L under the control of the virtualization infrastructure 604. Furthermore, a given one of the applications 610 may correspond to any of the modules 110, 120, 130 of FIG. 1.

The VMs/container sets 602 comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that may include at least one hypervisor.

A hypervisor platform may be used to implement a hypervisor within the virtualization infrastructure 604, where the hypervisor platform has an associated virtual infrastructure management system. The underlying physical machines may include one or more distributed processing platforms that include one or more storage systems.

In other implementations of the FIG. 6 embodiment, the VMs/container sets 602 include respective containers implemented using virtualization infrastructure 604 that provides operating system level virtualization functionality, such as support for containers running on bare metal hosts, or containers running on VMs. The containers may be implemented using respective kernel control groups of the operating system.

One or more of the processing modules or other components of an information processing system may each run on a computer, server, storage device or other processing platform element. A given such element is viewed as an example of a computing device. The cloud infrastructure 600 shown in FIG. 6 may represent at least a portion of one processing platform. Another example of such a processing platform is processing platform 700 shown in FIG. 7.

The processing platform 700 in this embodiment may include a plurality of processing devices, denoted 702-1, 702-2, 702-3, . . . 702-K, which communicate with one another over a network 704. For instance, a user's laptop or other computing resource that the user may attempt to access may be implemented according to the principles of one of the processing devices 702. Additionally, any of the software modules 110, 120, 130 may be implemented on one or more processing devices, such as any one of processing devices 702.

The network 704 may include any type of network, including by way of example a global computer network such as the Internet, a WAN, a LAN, a satellite network, a telephone or cable network, a cellular network, a wireless network such as a Wi-Fi or 5G network, or various portions or combinations of these and other types of networks.

The processing device 702-1 in the processing platform 700 may include a processor 710 coupled to a memory 712. The processor 710 may include a microprocessor, a microcontroller, an application-specific integrated circuit (ASIC), a field-programmable gate array (FPGA) or other type of processing circuitry, as well as portions or combinations of such circuitry elements.

The memory 712 may include random access memory (RAM), read-only memory (ROM) or other types of memory, in any combination. The memory 712 and other memories disclosed herein should be viewed as illustrative examples of processor-readable storage media or computer-readable media storing executable program code (e.g., computer-readable instructions) of one or more software programs.

Articles of manufacture including such processor-readable storage media are considered illustrative embodiments. A given such article of manufacture may include, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products including processor-readable storage media can be used.

Also included in the processing device 702-1 is network interface circuitry 714, which is used to interface the processing device with the network 704 and other system components and may include conventional transceivers.

The other processing devices 702 of the processing platform 700 are assumed to be configured in a manner similar to that shown for processing device 702-1. Each of the processing devices 702 is an example of an information handling system (IHS). Information handling systems may include any of a variety of devices, such as servers, personal computers, smart phones, and the like. Any of the processing devices 702 may be configured to execute computer-readable instructions to perform actions associated with FIGS. 1-5.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the implementation(s) described herein embrace all such modifications and changes and, accordingly, the above description should be regarded in an illustrative rather than a restrictive sense.

Although the implementation(s) is/are described herein with reference to specific embodiments, various modifications and changes can be made without departing from the scope of the present implementation(s), as set forth in the claims below. Accordingly, the specification and figures are to be regarded in an illustrative rather than a restrictive sense, and all such modifications are intended to be included within the scope of the present implementation(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method comprising:
receiving multi-modal input from a user, wherein the multi-modal input includes facial image data, voice data, and textual input data;
feeding the multi-modal input to a plurality of machine learning (ML) models to generate a plurality of preliminary results;
applying a first weight to a first preliminary result of the plurality of preliminary results, and applying a second weight to a second preliminary result of the plurality of preliminary results, wherein the first preliminary result corresponds to the facial image data, wherein the second preliminary result corresponds to the voice data, and wherein a third preliminary result corresponds to the textual input data, and wherein the first weight is based upon a first pre-defined set of factors and wherein the second weight is based upon a second pre-defined set of factors;
determining whether a weighted sum of the preliminary results, including the first preliminary result times the first weight and the second preliminary result times the second weight, corresponds to an authentication condition; and
either allowing or disallowing the user access to a computing resource based upon whether the weighted sum of the preliminary results corresponds to the authentication condition.

2. The method of claim 1, wherein the first pre-defined set of factors includes a first set of environmental factors and a first set of contextual factors, and wherein the second pre-defined set of factors includes a second set of environmental factors and a second set of contextual factors.

3. The method of claim 2, wherein the first weight includes a product of a parameterization of the first set of environmental factors and a parameterization of the first set of contextual factors times a first sensitivity parameter, and wherein the second weight includes a product of a parameterization of the second set of environmental factors and a parameterization of the second set of contextual factors times a second sensitivity parameter.

4. The method of claim 1, wherein the first pre-defined set of factors includes at least one item selected from the list consisting of:
background noise; and
microphone quality.

5. The method of claim 1, wherein the first pre-defined set of factors includes at least one item selected from a list consisting of:
lighting conditions; and
facial pose variability.

6. The method of claim 1, wherein the first pre-defined set of factors includes at least one item selected from a list consisting of:
language of received text; and
typing speed for received text.

7. The method of claim 1, wherein the first pre-defined set of factors includes at least one item selected from a list consisting of:
time of day; and
day of the week.

8. The method of claim 1, wherein the first pre-defined set of factors includes at least one item selected from a list consisting of:
location of the user; and
network environment of the user.

9. The method of claim 1, wherein the first pre-defined set of factors includes at least one item selected from a list consisting of:
interaction patterns of the user; and
task context of the user.

10. A method comprising:
receiving multi-modal input from a user;
feeding the multi-modal input to a plurality of machine learning (ML) models to generate a plurality of preliminary results;
applying a first weight to a first preliminary result of the plurality of preliminary results, and applying a second weight to a second preliminary result of the plurality of preliminary results, wherein the first weight is based upon a first pre-defined set of factors and wherein the second weight is based upon a second pre-defined set of factors, and wherein the first pre-defined set of factors includes a first set of environmental factors and a first set of contextual factors, and wherein the second pre-defined set of factors includes a second set of environmental factors and a second set of contextual factors;
determining whether a weighted sum of the preliminary results, including the first preliminary result times the first weight and the second preliminary result times the second weight, corresponds to an authentication condition; and
either allowing or disallowing the user access to a computing resource based upon whether the weighted sum of the preliminary results corresponds to the authentication condition.

11. The method of claim 10, wherein the first weight includes a product of a parameterization of the first set of environmental factors and a parameterization of the first set of contextual factors times a first sensitivity parameter, and wherein the second weight includes a product of a parameterization of the second set of environmental factors and a parameterization of the second set of contextual factors times a second sensitivity parameter.

12. An IHS (Information Handling System) comprising:
one or more processors;
one or more memory devices coupled to the one or more processors, the one or more memory devices storing computer-readable instructions that, upon execution by the one or more processors, cause the IHS to:
receive multi-modal input from a user during authorized use of the IHS by the user, wherein the multi-modal input includes facial image data, voice data, and textual input data;
feed the multi-modal input to a plurality of machine learning (ML) models to generate a plurality of preliminary results;

apply a first weight to a first preliminary result of the plurality of preliminary results, and applying a second weight to a second preliminary result of the plurality of preliminary results, wherein the first preliminary result corresponds to the facial image data, wherein the second preliminary result corresponds to the voice data, and wherein a third preliminary result corresponds to the textual input data, and wherein the first weight is based upon a first pre-defined set of factors and wherein the second weight is based upon a second pre-defined set of factors;

determine whether a weighted sum of the preliminary results, including the first preliminary result times the first weight and the second preliminary result times the second weight, corresponds to an authentication condition; and authorize the user and allow access to the IHS in response to the weighted sum of the preliminary results corresponding to the authentication condition.

13. The IHS of claim 12, further comprising computer-readable instructions to cause the IHS to:

encode the multi-modal input to generate encoded data;

decode the encoded data to generate decoded data;

determine whether an error between the decoded data and the multi-modal input indicates an anomaly; and disallow further access to the IHS by the user based upon determining that the error indicates the anomaly.

14. The IHS of claim 13, wherein the computer-readable instructions cause the IHS to:

prompt the user for an alternative authentication; and allow further access to the IHS by the user based upon the user providing the alternative authentication.

15. The IHS of claim 12, further comprising computer-readable instructions to cause the IHS to:

determine a validation status of a first mode of the multi-modal user input, including causing parallel validation functions to be performed at a plurality of nodes and applying a consensus function to results of the validation functions; and either use the first mode of the multi-modal user input for incremental learning by first ML model of the plurality of ML models or discard the first mode of the multi-modal user input based upon a result of the consensus function.

16. The IHS of claim 15, wherein the computer-readable instructions to cause the IHS to cause the parallel validation functions to be performed includes computer-readable instructions to cause the IHS to:

cause the parallel validation functions to be performed by a plurality of software components running on the IHS, wherein each of the software components is configured to manage a respective one of the ML models.

* * * * *